B. G. FITZHUGH.
Harvesting Machine.
No. 24,549.
Patented June 28, 1859.
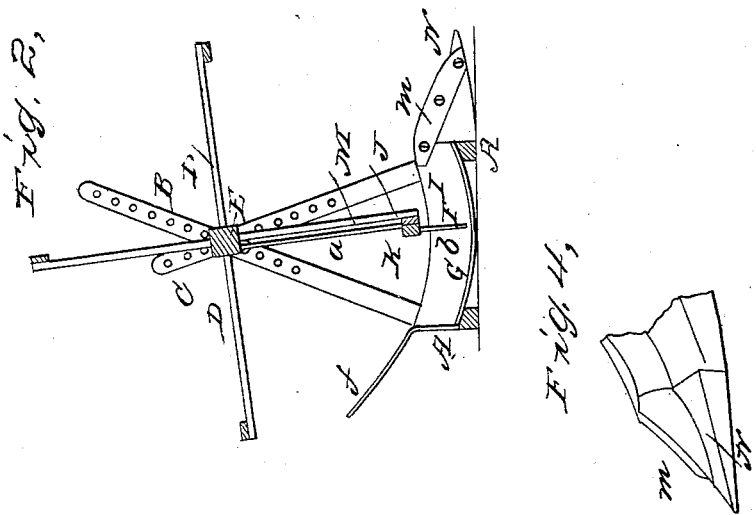
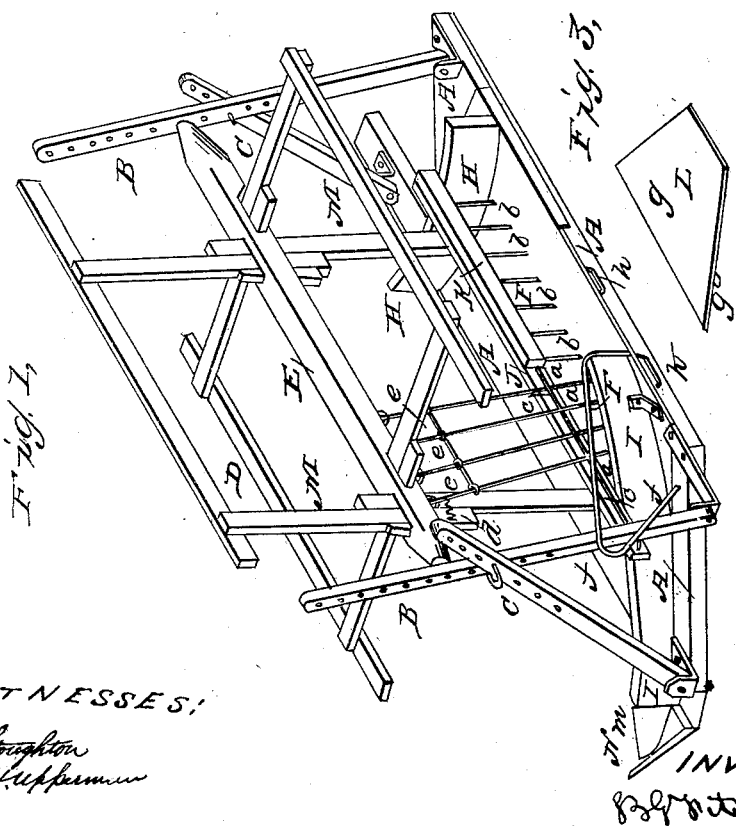

UNITED STATES PATENT OFFICE.

BENJAMIN G. FITZHUGH, OF FREDERICK, MARYLAND.

IMPROVEMENT IN HARVESTING-MACHINES.

Specification forming part of Letters Patent No. 24,549, dated June 28, 1859.

*To all whom it may concern:*

Be it known that I, BENJAMIN G. FITZHUGH, of Frederick, in the county of Frederick and State of Maryland, have invented certain new and useful Improvements in Harvesting-Machines; and I do hereby declare the following to be a full, clear, and exact dscription of the construction and operation of the same, reference being had to the accompanying drawings, making a part of this specification, in which—

Figure 1 represents in perspective so much of a harvesting-machine as will illustrate my invention. Fig. 2 represents a vertical cross-section through the reel, rake, and platform; and Figs. 3 and 4 represent detached portions of the machine as represented in Figs. 1 and 2.

Similar letters of reference, where they occur in the several figures, denote like parts of the machine in all of them.

My invention relates to the manner of constructing and operating the reel and rake; and it consists in the manner in which I have combined a rake with the reel of a harvesting-machine, so that the rake will deliver the cut material in gavels in a line oblique to the axis of the reel, though it revolves with the reel.

To enable others skilled in the art to make and use my invention, I will proceed to describe the same with reference to the drawings.

A represents a platform-frame, to the ends of which are hung the reel-posts B B and the reel-post braces C C in such manner as that the reel D, through its shaft E, may be raised or lowered or set farther forward or back, as may be desired, to effect a proper gathering in of the grain to the cutters, and to allow the rake F, which revolves with the reel, to clear the platform of the cut grain and deliver it in good shape upon the ground. The platform G is of a trapezoidal form, though its front and rear sides are parallel, but not of the same length, the rear side being much the shorter, so as to bring the cut material close together at its rear and deliver it onto the ground out of the line in which it originally stood before being cut, or out of the line whereon it falls when cut, and which is usually termed an "oblique delivery." The fence H, next the main frame, may stand at right angles to the finger or cutter-bar; but the outer fence, I, should incline from the outside cutting-point toward the rear of the platform, so as to direct the cut material out of the way of the path of the machine on its next throw, thus contracting the rear or delivery point of the platform; but both fences H and I may incline without affecting the principle involved.

On one of the reel-ribs J, I connect the rake F, so that it may be readily removed when desired; and to the reel-shaft E, I hinge or hang long rake-teeth $a\ a$, &c., as many as are required to operate in the space covered by the oblique position of the fence I, the other rake-teeth, $b$, being short and stationary in their rake-head K. The lower ends of the long rake-teeth $a$ are kept in line by a guide-rod, $e$, so that when the first one comes against the fence I it swings toward the second, and, carrying it along with it, contracts the rake just as the plaform itself is contracted, until by the rotation of the reel they clear the platform, and then a spring, $d$, returns them to their former position again, the first one drawing the others with it, as they are united by flexible connections $e$ for this purpose. The rake-teeth $b$ move over a space of uniform width at the front and rear, and of course need not be movable, though if it be desirable to give to that end of the platform an oblique form, then hinged or swung teeth may in the same manner be provided at that end as at the other.

$f$ is a guide for forcing in the teeth when, for instance, the machine should be backed and the reel turned the contrary way. Without a fixture for this purpose the rake would catch upon the end of the fence I. The reel-ribs themselves, being above the fences, would not catch upon them.

If the grain be in such condition that the rake cannot be advantageously used, it can be readily removed and the raker's stand L, Fig. 3, attached by its hooks $g\ g$ to the staples $h\ h$, the reel-arms M shortened by the keys and mortises in the reel-shaft, and the delivery done by hand, the reel being swung forward as the arms are shortened, so as to properly catch and enter the grain and draw it to the cutters and onto the platform, whence it is raked off by the raker on his stand. The platform G is concave from front to rear, as seen in Fig. 2, the object of this being that a revolving rake may move in close proximity to and thus rake off everything from its surface. If the platform were flat or not curved, the rake-teeth, unless they had a falling-and-rising movement of some kind, could not pass over its entire surface. By curving the platform the moving of the rake to and from the platform is avoided, and yet they sweep its whole surface.

N is the outside shoe or divider. (Shown on a larger scale in Fig. 4.) It may be furnished with a cutter, $m$, or a cutting-edge on its rising line, for the purpose of cutting through any tangled grass or grain which might otherwise hang thereon.

Having thus fully described the nature and object of my invention, what I claim as new is—

The combination of a rake and reel revolving on the same shaft, when the rake is so made as to deliver the cut material in a line oblique to the swath of the machine, substantially as described.

B. G. FITZHUGH.

Witnesses:
A. B. STOUGHTON,
THOS. H. UPPERMAN.